United States Patent [19]
Amelio et al.
[11] 3,853,634
[45] Dec. 10, 1974

[54] SELF-ALIGNED IMPLANTED BARRIER TWO-PHASE CHARGE COUPLED DEVICES

[75] Inventors: Gilbert F. Amelio, Saratoga; Choong-Ki Kim; Phillip J. Salsbury, both of Sunnyvale, all of Calif.

[73] Assignee: Fairchild Camera and Instrument Corporation, Mountain View, Calif.

[22] Filed: May 21, 1973

[21] Appl. No.: 362,132

[52] U.S. Cl. ............... 148/1.5, 148/187, 317/235 B
[51] Int. Cl. ............... H01l 7/54
[58] Field of Search ........... 148/1.5, 187; 317/235 B

[56] References Cited

UNITED STATES PATENTS

| | | | |
|---|---|---|---|
| 3,475,234 | 10/1969 | Kerwin et al. | 148/187 |
| 3,699,646 | 10/1972 | Vadasz | 148/187 X |
| 3,717,790 | 2/1973 | Dalton et al. | 148/1.5 |

*Primary Examiner*—L. Dewayne Rutledge
*Assistant Examiner*—J. M. Davis
*Attorney, Agent, or Firm*—Alan H. MacPherson; Roger S. Borovoy

[57] ABSTRACT

The asymmetrical implanted regions required in a single-level electrode two-phase charge coupled device structure are formed by a process which accurately aligns one edge of each ion-implanted region with an edge of a corresponding conductive electrode overlying the ion-implanted region.

9 Claims, 6 Drawing Figures

SELF-ALIGNED IMPLANTED BARRIER TWO-PHASE CHARGE COUPLED DEVICES

BACKGROUND OF THE INVENTION

1. Field of the Invention

This invention relates to charge coupled devices and in particular to a charge coupled device capable of two-phase operation and the process for making it.

2. Description of the Prior Art

W. S. Boyle and G. E. Smith describe the basic concept of charge coupled semiconductor devices (hereinafter referred to as "CCD") in an article published in the April 1970 *Bell System Technical Journal*, page 587, entitled "Charge Coupled Semiconductor Devices." As discussed by Boyle and Smith, charge coupled devices are potentially useful as shift registers, delay-lines, and in two dimensions, as imaging or display devices.

In Patent Application Ser. No. 343,759 filed on Mar. 22, 1973 by Choong-Ki Kim and Rudolph H. Dyck entitled "A Buried Channel, Charge Coupled Linear Imaging Device," a linear imaging array is described where in one embodiment charge is detected in a line of light sensing elements and then transferred to two transport arrays adjacent to the imaging array by controlling the potential on transfer gates between the light sensing elements and the transport arrays. To reach the transport arrays, the charge is transferred in a direction approximately perpendicular to the linear array of light sensing elements before being read out for further processing. In the structure disclosed by Kim and Dyck, the transfer gate consumes surface area in the device and results in a layout topology which sometimes is cumbersome.

One of the difficulties of prior art charge coupled devices is that normally three-phase operation is required. Alternatively, while techniques have been proposed for two-phase operation (see an article by Krambeck, Walden and Pickar entitled "Implanted-Barrier Two-Phase Charge-Coupled Device" published in Applied Physics Letters, Vol. 19, No. 12, pp. 520–522, 1971) these techniques require extremely accurate processing to yield devices with predictable, reproducible characteristics.

SUMMARY OF THE INVENTION

This invention overcomes the difficulties of prior art devices by providing a CCD structure capable of optimum two-phase operation.

The CCD structure of this invention has the ion-implanted region necessary to the attainment of two-phase operation approximately aligned with respect to one edge of a corresponding electrode. This alignment is achieved automatically by the process of this invention. This reduces the criticality of the associated processing step resulting in greater manufacturing ease and optimum device performance.

DESCRIPTION OF THE DRAWINGS

FIGS. 1*a* through 2*c* illustrate one process of this invention; and

FIGS. 2*a* through 2*c* illustrate a second process of this invention.

DETAILED DESCRIPTION OF THE INVENTION

This invention will be described in conjunction with a CCD structure manufactured using silicon semiconductor material. It should be understood that any semiconductor material which is capable of supporting surface charges of the type required in a CCD structure and likewise capable of being used for the formation of MOS devices can be used with this invention. It should further be noted that the drawings used to illustrate this invention are not drawn to scale but rather are designed merely to illustrate the principles of the invention by depicting only a small portion of a semiconductor die.

Figure 1A:
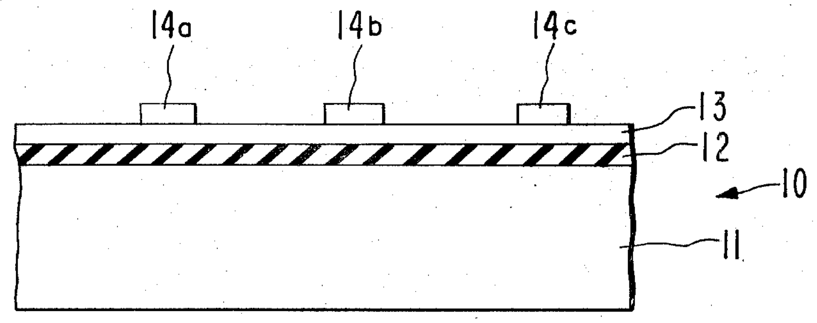

FIG. 1*a* shows a semiconductor wafer 10 comprising a silicon substrate 11 on which is formed insulation 12 and polycrystalline silicon 13. Typically, insulation 12 comprises a single layer of silicon dioxide, although this insulation can also comprise any other insulation material or materials suitable for use in a charge coupled device. Polycrystalline silicon 13 is formed on the top surface of insulation 12 in a manner well known in the semiconductor art and more particularly in a manner described in patent application Ser. No. 313,011 filed Dec. 7, 1972 on an invention of Gilbert F. Amelio and Phillip J. Salsbury entitled "Uniplanar CCD Structure and Method" assigned to the assignee of this invention. A layer 14 (not shown) of silicon dioxide is then formed over the top surface of polycrystalline silicon 13. Selected portions of layer 14 are removed from the top surface of polycrystalline silicon 13, using well known photo-lithographic techniques, to leave on the top surface of polycrystalline silicon 13 a plurality of strips of silicon dioxide of which strips 14*a*, 14*b* and 14*c* are shown. These strips extend across and along the top surface of polycrystalline silicon 13 in a direction perpendicular to the plane of the drawing so as to completely cross that region of the underlying silicon 11 in which the charge is stored and transferred.

Figure 1B:
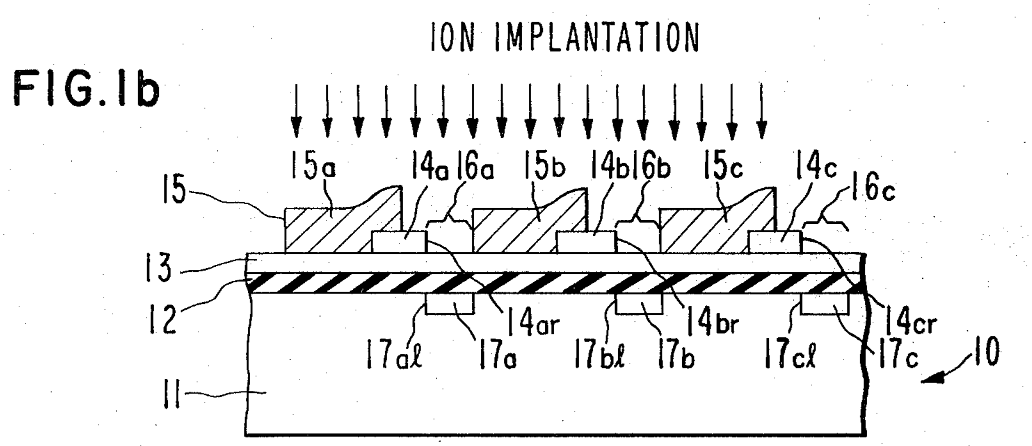

After strips 14*a* through 14*c* are formed on the surface of polycrystalline silicon 13, the exposed portions of polycrystalline silicon 13 and silicon dioxide strips 14*a*, 14*b*, 14*c*, etc. are coated with photoresist 15. In one embodiment, layer 15 is formed from the well known Waycoat photoresist to a thickness of 8,000 angstroms. However, other photoresists and/or materials (such as evaporated aluminum) capable of capturing ions directed at the surface of the substrate by an electron beam are suitable for use in this invention. Photoresist layer 15 is then masked, selected portions of photoresist 15 to be retained on the device surface are exposed to light, the mask is removed and the unexposed portions of photoresist are removed from the wafer, typically by developing. The result is to expose a portion of silicon dioxide strips 14*a*, 14*b*, 14*c*, etc. and adjacent portions 16*a*, 16*b*, 16*c*, etc. of the top surface of polycrystalline silicon 13. Ions are then implanted in region 17*a*, 17*b*, 17*c*, etc., of silicon 11 adjacent the top surface of silicon 11 just beneath insulation 12. These ions are transmitted through the exposed portions 16*a*, 16*b*, 16*c*, etc., of the top surface of polycrystalline silicon 13. Ions, of course, strike portions 15*a*, 15*b*, 15*c*, etc., of photoresist and strips 14*a*, 14*b*, 14*c*, etc., of silicon dioxide. However, photoresist 15 is of such a thickness that it absorbs the ions incident upon it while silicon dioxide likewise absorbs the ions incident upon it. Accordingly, only those ions which strike the portions of the surface of polycrystalline silicon 13 exposed by windows 16*a*, 16*b*, 16*c*, etc., pass through the polycrystalline silicon 13 and the underlying insulation 12 to form ion-implanted regions 17*a*, 17*b*, 17*c*, etc. The result is that the left hand edges 17*al*, 17*bl*, 17*cl*, etc. of ion-implanted regions 17*a*, 17*b*, 17*c*, etc. respectively, are accurately aligned beneath the right hand edges 14*ar*, 14*br*, 14*cr*, etc. of silicon dioxide strips 14*a*, 14*b*, 14*c*, etc., respectively (FIG. 1*b*).

Figure 1C:
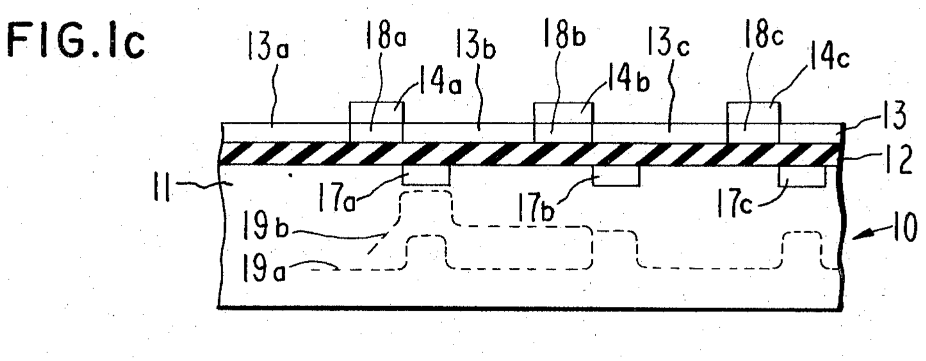

Next, photoresist 15*a*, 15*b*, 15*c*, etc., is removed from the surface of the device, leaving the strips of silicon dioxide 14*a*, 14*b*, 14*c*, etc., (FIG. 1*c*). An impurity in one embodiment is then diffused into the exposed portions of polycrystalline silicon 13 to form conductive gate electrodes 13*a*, 13*b*, 13*c*, etc., (FIG. 1*c*). Silicon dioxide 14*a*, 14*b*, 14*c*, etc., remains on the device to mask the underlying polycrystalline regions 18*a*, 18*b*, 18*c*, etc., from the impurities. Accordingly, polycrystalline silicon 13 is transformed into a plurality of conductive electrodes 13*a*, 13*b*, 13*c*, etc., each separated from the adjacent electrodes by a multiplicity of resistive regions 18*a*, 18*b*, 18*c*, etc., formed of intrinsic polycrystalline silicon. Such a structure is shown in U.S. Pat. No. 3,728,590 issued Apr. 17, 1973 on an invention of Kim and Snow.

Figure 2A:
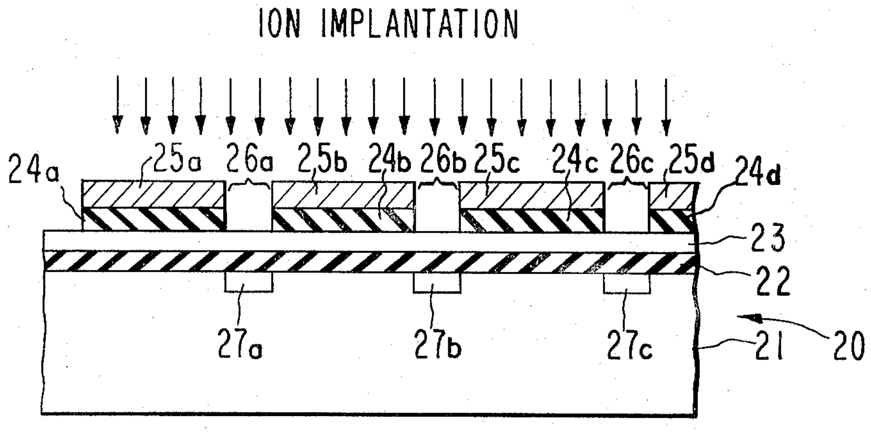
Figure 2B:
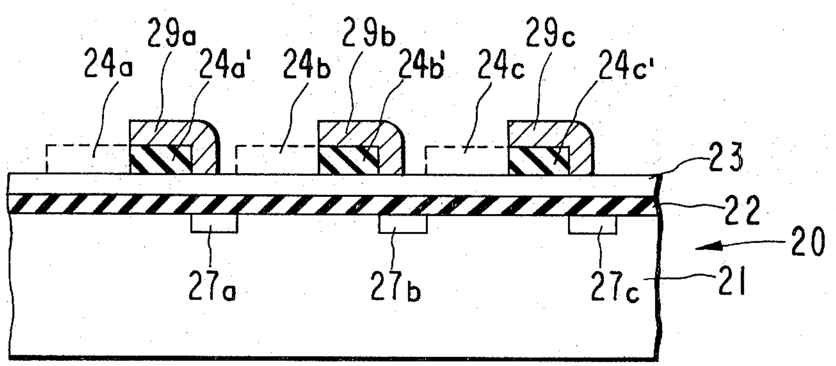
Figure 2C:
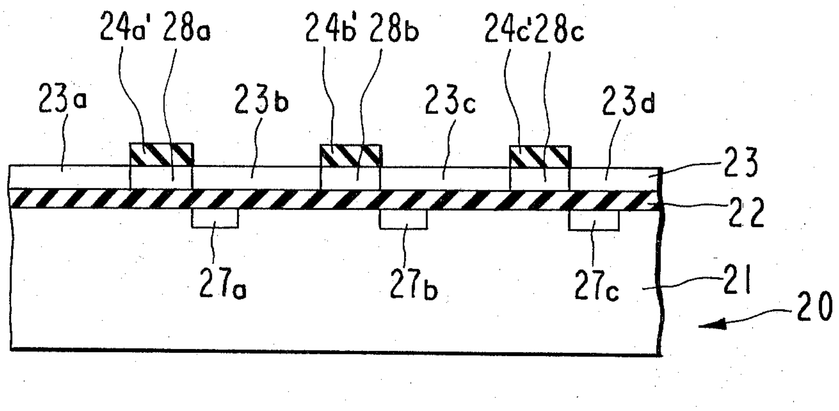

An alternative process in accordance with this invention is shown in FIGS. 2*a* through 2*c*. In FIG. 2*a*, wafer 20 comprises a silicon semiconductor material 21 upon which is formed insulation 22 and polycrystalline silicon 23. Photoresist 25 is then formed over silicon dioxide 24, the photoresist is masked, exposed to light and the unexposed portions of the photoresist are removed from the wafer. Then the exposed portions of the silicon dioxide layer 24 are etched down to the polycrystalline silicon 23 to leave windows 26*a*, 26*b*, 26*c*, etc. through the photoresist 25 and the silicon dioxide 24 to expose portions of the surface of the polycrystalline silicon 23. Then, ions are implanted in a well-known manner through the windows 26*a*, 26*b*, 26*c*, etc., to form ion-implanted regions 27*a*, 27*b*, 27*c*, etc., respectively, in silicon material 21. Regions 27*a*, 27*b*, 27*c*, etc., are formed in the top surface of silicon 21 directly beneath oxide layer 22. Those ions, however, incident on photoresist 25 and silicon dioxide 24 are captured by the photoresist 25 and silicon dioxide 24 and do not penetrate through these materials to polycrystalline silicon 23, insulation 22 and the underlying semiconductor material 21. In addition, those ions incident upon the exposed polycrystalline silicon 23 through windows 26*a*, 26*b* and 26*c* have sufficient energy to penetrate through the polycrystalline silicon 23 and the silicon dioxide 22 to the underlying silicon material 21.

After the ion-implantation step, the photoresist 25 is removed from the oxide and a new photoresist layer 29 is formed over the oxide strips 24*a*, 24*b*, 24*c*, etc., and those portions of the top surface of polycrystalline silicon 23 exposed by windows 26*a*, 26*b* and 26*c*. The photoresist is masked, exposed to light, and the unexposed portions of the photoresist are removed by developing to expose the left portion of each oxide strip 24*a*, 24*b*, 24*c*, etc. The exposed portion of each oxide strip is then removed by etching to expose the underlying polycrystalline silicon 23 (FIG. 2*b*). The result is to leave a portion 24*a*', 24*b*', 24*c*', etc., of silicon dioxide on the polycrystalline silicon 23. The right edges of silicon dioxide sections 24*a*', 24*b*', 24*c*', etc. are aligned directly above the left edges of ion-implanted regions 27*a*, 27*b*, 27*c*, etc., respectively.

Next, photoresist 29 is removed and impurities are placed in the exposed portions of polycrystalline silicon 23, typically by diffusion, as in the process of FIGS. 1*a* through 1*c*, although these impurities could also be implanted. The result is to form a plurality of highly conductive polycrystalline silicon electrodes 23*a*, 23*b*, 23*c*, 23*d*, etc., on the top surface of insulation 22 separated by resistive polycrystalline silicon 28*a*, 28*b*, 28*c*, etc.

The structures shown in FIGS. 1*c* and 2*c* can be further processed by placing a protective layer of material over the top surface of polycrystalline silicon 13 and 23 and by forming conductive contacts to the electrodes 13*a*, 13*b*, 13*c*, etc. (FIG. 1*c*) and 23*a*, 23*b*, 23*c*, 23*d*, etc., (FIG. 2*c*). Further processing required to place these structures in a condition suitable for use is obvious to those skilled in the semiconductor arts.

The resulting structures shown in FIGS. 1*c* and 2*c* are made by processes which insure that the ion-implanted regions in the top surface of the silicon substrate have one of their edges accurately aligned with a corresponding edge of an electrode overlying the ion-implanted region. If substrate 11 (FIG. 1*a*) is P type conductivity, for example, then the ion-implanted regions 17*a*, 17*b*, 17*c*, etc., will likewise be of P type conductivity but with a higher impurity concentration than the impurity concentration in the substrate. The result is that the electron potential in the semiconductor material directly beneath an ion-implanted region is higher than the electron potential in the adjacent semiconductor material. This is shown by the lines labeled 19*a* and 19*b* in FIG. 1*c*. The electron potential in the ion-implanted region is always a given amount above the electron potential in the semiconductor material beneath the remaining portions of the electrode above the ion-implanted region. Thus charge is transferred into a region of semiconductor material beneath a given electrode, for example, electrode 13*c*, from the semiconductor material beneath an adjacent electrode 13*b*, by raising the potential on electrode 13*b* (i.e., lowering its voltage, where the term "voltage" is used in its conventional sense) relative to the potential on electrode 13*c* a sufficient amount above the potential of ion-implanted region 17*b* to allow electrons beneath electrode 13*b* to transfer to the semiconductor material beneath electrode 13*c*. Line 19*b* shows the potential beneath electrodes 13*b* and 13*c* for this transfer to occur.

In the method depicted in FIGS. 1*a* through 1*c*, a variation in the placement of the mask used to form windows 16*a*, 16*b*, 16*c*, etc., through photoresist 15 results in a variation in the width of the ion-implanted region 17*a*, 17*b*, 17*c*, etc. However, all ion-implanted regions 17 vary in width by approximately the same amount. The method of FIGS. 2*a* through 2*c* on the other hand, insures that all ion-implanted regions 27*a*, 27*b*, 27*c*, etc., have the same width, but that variations in the placement of the mask vary the width of the electrodes 23*a*, 23*b*, 23*c*, etc. formed from the polycrystalline silicon 23. Thus the main difference between the process illustrated by FIGS. 1*a* through 1*c* as opposed to that illustrated by FIGS. 2*a* through 2*c* is that in the former process, the gate electrode areas are defined first while in the latter process, the ion-implanted regions are defined first. Thus in the latter process errors in mask alignment result in variations in the inter-electrode spacings. The advantage, however, of the process of FIGS. 2*a* through 2*c* is the planarity of the surface during the etching of windows 26*a*, 26*b*, 26*c*, through the photoresist. Thus this latter process is probably preferred in most situations to the former process. A major advantage of this invention is the elimination of the critical alignment between the gate mask and the ion-implantation mask required by prior art processes.

While the above invention has been described in conjunction with the forming of the implanted asymmetrical regions necessary to construct a two-phase CCD structure, it should be noted that for the purpose of simplicity, the other steps required to complete the construction of the CCD device have not been described in detail. In particular, the formation of the channel stop region around the portions of semiconductor material beneath the electrodes 13a, 13b, 13c, etc., (FIG. 1c) and 23a, 23b, 23c, 23d, etc., (FIG. 2c) has not been shown.

In one embodiment of this invention, the semiconductor material 11 (FIG. 1a) was silicon. Insulation 12 consisted of a layer of silicon dioxide formed to a thickness of about 1,500 angstroms. Polycrystalline silicon layer 13 was formed from the decomposition of silane at 950° C. to a thickness of 5,000 angstroms. Silicon dioxide strips 14a, 14b, 14c, etc., had a thickness of 0.3 to 0.5 microns. The photoresist 15 (FIG. 1b) was formed to a thickness of 0.8 to 1.0 microns. This photoresist was the well known Waycoat resist, although other photoresists are also suitable for use in this invention.

The method of this invention is compatible with CCD buried channel devices.

What is claimed is:

1. The method of forming ion-implanted regions in semiconductor material overlaid by insulation and a layer of polycrystalline silicon, which comprises the steps of:

forming strips of ion-absorbing and impurity-masking material on the surface of said polycrystalline silicon;

forming photoresist over the surface of said polycrystalline silicon and said strips of ion-absorbing and impurity-masking material;

removing selected portions of said photoresist to expose portions of said polycrystalline silicon and portions of said strips of ion-absorbing and impurity-masking material; and implanting ions in the semiconductor material underlying the exposed polycrystalline silicon thereby to form in said semiconductor material a plurality of ion-implanted regions.

2. The method of claim 1 including the additional step of:

removing said photoresist; and placing selected impurities in said polycrystalline silicon to form a plurality of conductive electrodes from said polycrystalline silicon, each electrode being separated from adjacent electrodes by undoped portions of said polycrystalline silicon protected from said impurities by selected ones of said overlying strips of ion-absorbing and impurity-masking material.

3. The method of claim 2 wherein said step of placing selected impurities in said polycrystalline silicon to form a plurality of conductive electrodes results in an edge of each of said electrodes being approximately aligned with one edge of a corresponding ion-implanted region in said semiconductor material.

4. The method of claim 2 wherein said step of placing selected impurities in said polycrystalline silicon comprises diffusing said impurities into said polycrystalline silicon.

5. The method of claim 4 wherein said semiconductor material is silicon.

6. The method of claim 1 wherein said semiconductor material is silicon.

7. The method of forming ion-implanted regions in a semiconductor substrate overlaid by insulation and a layer of polycrystalline silicon, which comprises the steps of:

forming a layer of ion-absorbing and impurity-masking material over the top surface of said polycrystalline silicon;

forming a layer of photoresist on the top surface of said layer of ion-absorbing and impurity-masking material;

forming a plurality of windows in said photoresist and said ion-absorbing and impurity-masking material thereby to expose a plurality of first regions of said polycrystalline silicon;

implanting ions in said underlying semiconductor substrate through the exposed first regions of said polycrystalline silicon and the underlying insulation thereby to form a plurality of ion-implanted regions in said underlying semiconductor material;

removing a plurality of portions of the ion-absorbing and impurity-masking material on the top surface of said polycrystalline silicon thereby to expose a plurality of second regions of said polycrystalline silicon, each second region being contiguous with a corresponding first region on a one-for-one basis; and placing impurities in the plurality of first and plurality of second regions of said polycrystalline silicon thereby to form a plurality of conductive electrodes from said polycrystalline silicon, each of said electrodes comprising the contiguous material in a first and second region and being separated from adjacent electrodes by at least one undoped region of polycrystalline silicon underlying the remaining ion-absorbing and impurity-masking material.

8. The method of claim 7 wherein said semiconductor material is silicon.

9. The method of claim 7 wherein said step of placing impurities in the first and second regions of said polycrystalline silicon thereby to form a plurality of conductive electrodes results in an edge of each conductive electrode being approximately aligned with the edge of a corresponding ion-implanted region.

* * * * *